(12) United States Patent
Kam et al.

(10) Patent No.: US 11,760,328 B2
(45) Date of Patent: Sep. 19, 2023

(54) SOLENOID VALVE FOR VEHICLE BRAKE

(71) Applicant: HYUNDAI MOBIS CO., LTD., Seoul (KR)

(72) Inventors: Moo Chul Kam, Yongin-si (KR); Seung Hwan Jeong, Seoul (KR); Jae Hoon Jung, Yongin-si (KR); Jeonggeol Lee, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/530,634

(22) Filed: Nov. 19, 2021

(65) Prior Publication Data
US 2023/0028195 A1    Jan. 26, 2023

(30) Foreign Application Priority Data
Jul. 21, 2021  (KR) .......................... 10-2021-0095611

(51) Int. Cl.
*F16K 31/06* (2006.01)
*B60T 13/68* (2006.01)

(52) U.S. Cl.
CPC ........ *B60T 13/686* (2013.01); *F16K 31/0696* (2013.01)

(58) Field of Classification Search
CPC ............. F16K 31/0696; F16K 31/0686; H01F 2007/085; H01F 7/088
See application file for complete search history.

(56) References Cited

U.S. PATENT DOCUMENTS

| | | | | |
|---|---|---|---|---|
| 3,974,998 A | * | 8/1976 | Wood ........................ | B05B 9/03 137/594 |
| 5,918,818 A | * | 7/1999 | Takeda ................ | F16K 31/0665 239/585.4 |
| 9,947,449 B2 | * | 4/2018 | Fruth ................... | F16K 31/0696 |
| 2002/0113219 A1 | * | 8/2002 | Rembold ............ | F16K 31/0665 251/129.14 |

(Continued)

FOREIGN PATENT DOCUMENTS

| | | | | |
|---|---|---|---|---|
| EP | 3492789 A1 | * | 6/2019 | ......... F16K 31/0655 |
| KR | 1020100043817 A | | 4/2010 | |

(Continued)

OTHER PUBLICATIONS

Korean Office Action dated Dec. 20, 2022 issued in corresponding Korean Application No. 10-2021-0095611.

*Primary Examiner* — Matthew W Jellett
(74) *Attorney, Agent, or Firm* — Novo TechIP International PLLC

(57) ABSTRACT

The present disclosure in at least one embodiment provides a solenoid valve for a vehicle brake, including a sleeve internally formed with a hollow interior space and fixed to a pump housing, a coil surrounding the sleeve, a first magnetic body at least partially accommodated in the hollow interior space of the sleeve, a second magnetic body at least partially accommodated in the hollow interior space of the sleeve, an elastic member disposed between the first magnetic body and the second magnetic body, an orifice configured to open and close as the second magnetic body moves, and a damping member disposed between the first magnetic body and the second magnetic body to form a gap between the first magnetic body and the second magnetic body.

7 Claims, 11 Drawing Sheets

(56) References Cited

U.S. PATENT DOCUMENTS

2018/0223943 A1* 8/2018 Reuter ................ F16K 31/0655
2019/0092305 A1* 3/2019 Jeon ........................ F16K 31/10

FOREIGN PATENT DOCUMENTS

| KR | 1020120118202 A | 10/2012 |
| KR | 1020190028923 A | 3/2019 |
| KR | 1020190034930 A | 4/2019 |

* cited by examiner

SOLENOID VALVE FOR VEHICLE BRAKE

CROSS-REFERENCE TO RELATED APPLICATIONS

This application is based on, and claims priority from, Korean Patent Application Number 10-2021-0095611, filed Jul. 21, 2021, the disclosure of which is incorporated by reference herein in its entirety.

BACKGROUND OF THE INVENTION

1. Field of the Invention

The present disclosure in some embodiments relates to a solenoid valve for a vehicle brake.

2. Discussion of Related Art

The statements in this section merely provide background information related to the present disclosure and do not necessarily constitute prior art.

A recent electric braking system for vehicles is equipped with an anti-lock brake system (ABS) function that is a function for preventing locking of the wheels during braking. The ABS reduces the hydraulic pressure applied to the wheel brakes to resolve the locking of the wheels. This prevents wheel slip caused by braking.

The ABS repeats opening and closing of the pressure-reducing valve communicating with a reservoir and/or a master cylinder to reduce the hydraulic pressure applied to the wheel brakes and thereby prevent the wheel slip.

FIG. 11 is a cross-sectional view of a conventional solenoid valve for a brake of a vehicle.

As shown in FIG. 11, in case of reducing the hydraulic pressure on the wheel brakes by, for example, operating an ABS of the vehicle, the conventional solenoid valve applies an electric current to the coil (not shown). When the current is applied to the coil, a magnetic field inside the coil causes electromagnetic force $F_M$ to act on a plunger 11 of a pressure-reducing valve. When electromagnetic force $F_M$ overpowers the sum of hydraulic force $F_P$ and elastic force $F_S$ of an elastic member 13, the plunger 11 begins to move toward a stator 12. Here, hydraulic force $F_P$ is a force due to the fluid pressure between the stator 12 and the plunger 11. The plunger 11 when moving toward the stator 12 opens an orifice 14 and transfers the working fluid on the wheel brakes to a master cylinder and/or a reservoir to reduce the hydraulic pressure on the wheel brakes.

When the stator 12 gets close to the plunger 11 narrowing their interspace, the electromagnetic force increases rapidly by Equation 1.

$$F_M \propto \frac{1}{Gap^2} \quad \text{[Equation 1]}$$

This propels the stator 12 and the plunger 11 to collide at a high speed to generate a big impact sound. The impact sound is channeled into the vehicle to add to the interior noise of the vehicle.

BRIEF SUMMARY OF THE INVENTION

According to at least one embodiment, the present disclosure provides a solenoid valve for a vehicle brake, including a sleeve internally formed with a hollow interior space and fixed to a pump housing, a coil surrounding the sleeve, a first magnetic body at least partially positioned or accommodated in the hollow interior space of the sleeve, a second magnetic body at least partially positioned or accommodated in the hollow interior space of the sleeve, an elastic member disposed between the first magnetic body and the second magnetic body, an orifice configured to open and close as the second magnetic body moves, and a damping member disposed between the first magnetic body and the second magnetic body to form a gap between the first magnetic body and the second magnetic body.

DETAILED DESCRIPTION OF THE INVENTION

Figure 1:
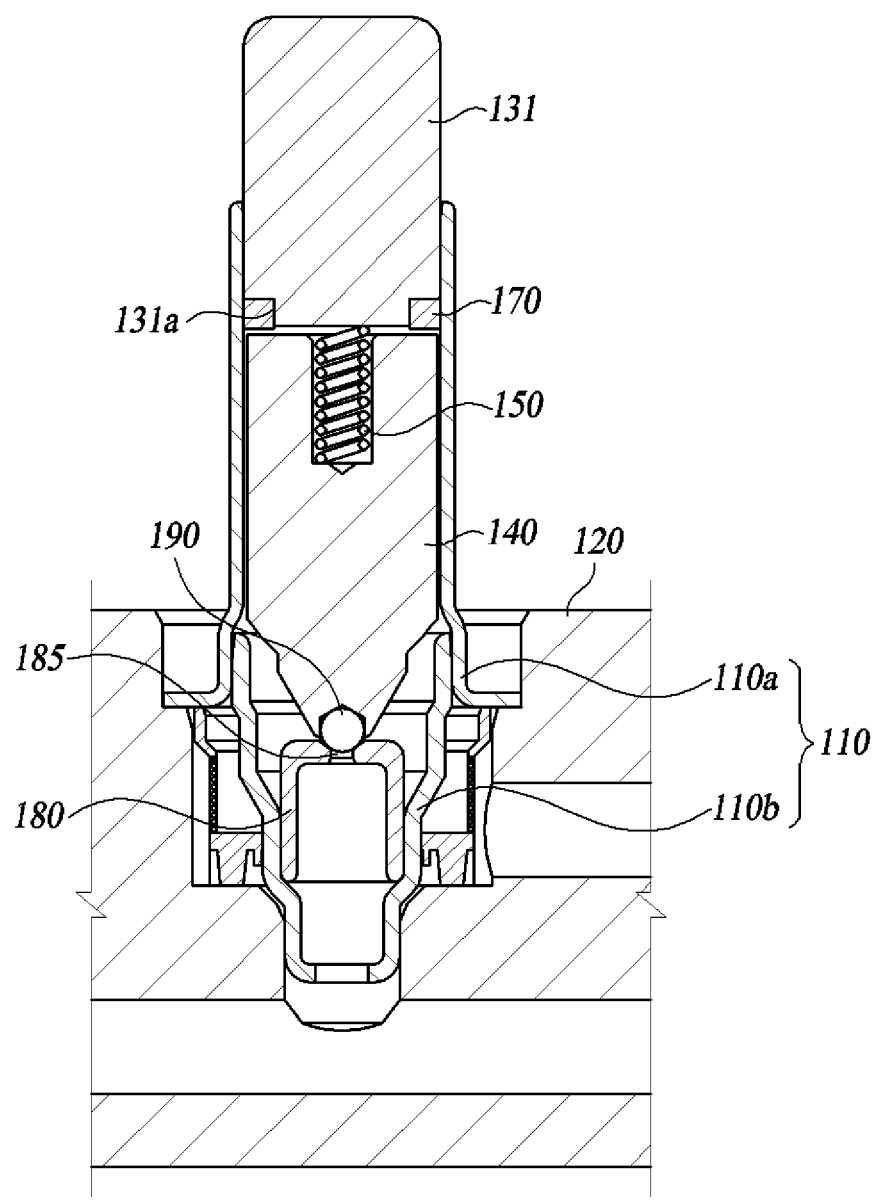
FIG. 1 is a cross-sectional view of a solenoid valve for a vehicle brake comprising, the first magnetic body and the damping member according to the first embodiment of the present disclosure, in a closed state.

The present disclosure in at least one embodiment seeks to provide a solenoid valve for a vehicle, which reduces interior noise of the vehicle by inserting a damping member in an accommodating groove of a stator between the stator and the plunger.

The issues to be solved by the present disclosure are not limited to those mentioned above, and other unmentioned issues to be resolved by the present disclosure will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

Referring to FIGS. 1 to 10, the solenoid valve for a vehicle brake according to at least one embodiment of the present disclosure includes all or some of a sleeve 110, a coil (not shown), a first magnetic body 131,132,133, a second magnetic body 140, an elastic member 150, an orifice 185, and a damping member 171,172,173,174.

The sleeve 110 has a hollow interior space. The sleeve 110 is fixed to a pump housing 120. The pump housing 120 is formed with a boring in which the sleeve 110 is installed. The inner peripheral surface of the sleeve 110 conforms to an outer peripheral surface of the second magnetic body 140. In this structure, the second magnetic body 140 is guided by the sleeve 110 and can move forward and backward within the hollow interior space of the sleeve 110.

The sleeve 110 may be divided into an upper section and a lower section of the sleeve 110a, 110b. The lower section of the sleeve 110b is press-fitted to the boring of the pump housing 120 and into the upper section of the sleeve 110a to fixedly install the sleeve 110. However, the present disclosure is not limited to this particular structure, and the sleeve 110 may be integrally formed as long as the sleeve 110 is formed with a hollow interior space and is fixed to the pump housing 120. Additionally, the present disclosure envisions other various embodiments such as press-fitting the upper section of the sleeve 110a into the lower section of the sleeve 110b.

Installed inside the sleeve 110 are the first magnetic body 131,132,133 that is fixed and the second magnetic body 140 moving forward and backward within the sleeve 110. The first magnetic body 130 and the second magnetic body 140 may be formed in a cylindrical shape that is concentric with the central axis of the sleeve 110. An upper portion of the first magnetic body 131,132,133 may be exposed to the outside of the sleeve 110. The sleeve 110 may have an open top so that the upper portion of the first magnetic body 130 is exposed to the outside of the sleeve 110. In the hollow interior space of the sleeve 110, a seat 180 may be installed with an orifice 185 formed therein. However, the seat 180 is not necessarily included in the solenoid for the vehicle brake of the present disclosure.

As shown in FIG. 1, when no electric current is applied to the coil (not shown), the orifice 185 of the seat 180 is closed by a spherical member 190 provided to move in unison with the second magnetic body 140.

Figure 2:
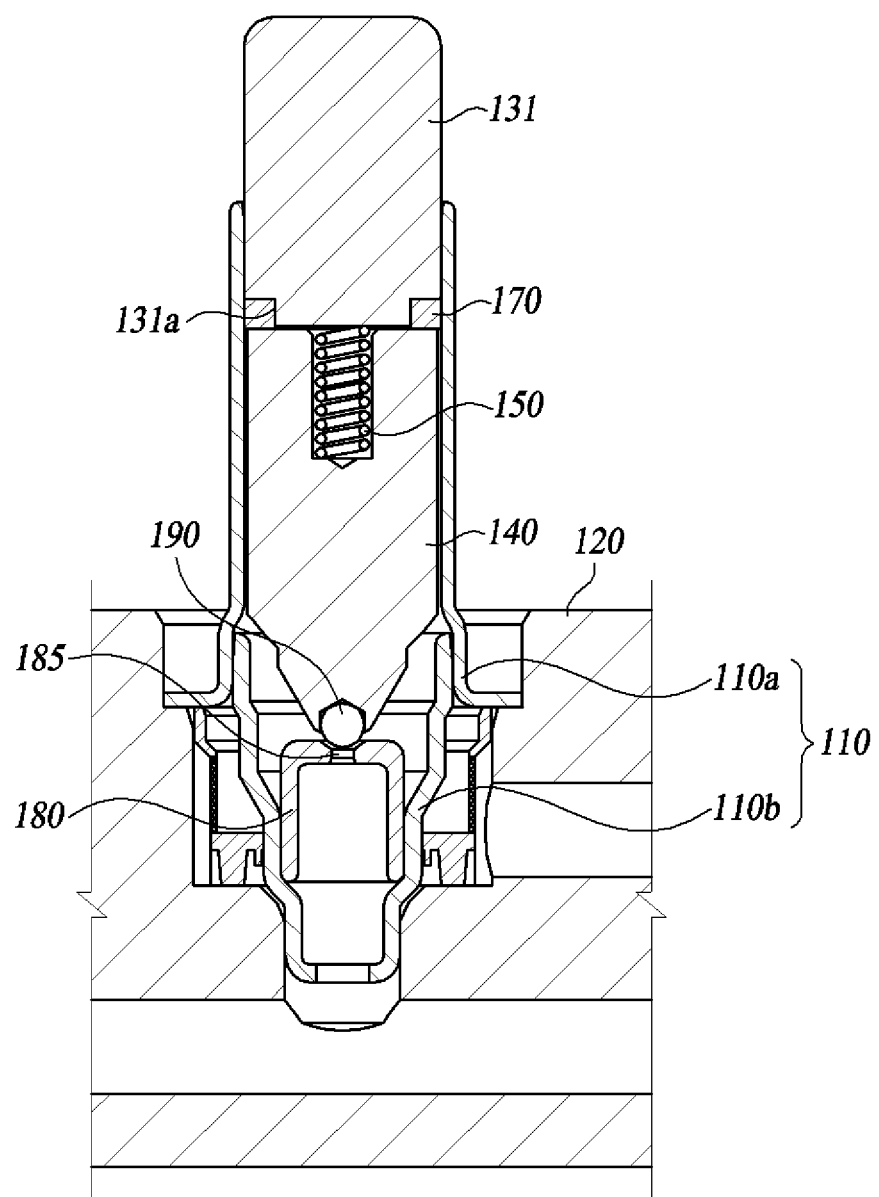
FIG. 2 is a cross-sectional view of the solenoid valve for a vehicle brake comprising, the first magnetic body and the damping member according to the first embodiment of the present disclosure, in an open state.

As shown in FIG. 2, when an electric current is applied to the coil, the spherical member 190 moves up toward the first magnetic body 131 along with the second magnetic body 140, thereby opening the orifice 185. Due to the opening of the orifice 185, high-pressure working fluid on the upper side of the seat 180 is discharged to a discharge port on the lower side of the seat 180. The coil wraps around the sleeve 110.

As shown in FIGS. 1 to 10, An electronic control unit (not shown) disposed on the upper side of the solenoid valve generates an electrical signal for allowing current to flow in the coil. The strength of the magnetic field formed inside the coil may be adjusted by adjusting the electrical signal generated by the electronic control unit, the cross-sectional area of the coil, and the number of turns of the wire per unit length.

The first magnetic body 131,132,133 is at least partially positioned or accommodated in the hollow interior space of the sleeve 110. With an electric current applied to the coil, the first magnetic body 131,132,133 is magnetized.

As shown in FIGS. 1 to 9, The first magnetic body 131,132 may have one surface that faces the pump housing 120 and is formed with an accommodating groove 131a, 132a. The first magnetic body 131,132 is fixed to the sleeve 110. The first magnetic body 131,132 may be press-fitted into the sleeve 110 to be fixed in place, but the present disclosure is not so limited. The accommodating groove 131a,132a of the first magnetic body 131,132 is formed on the one surface thereof facing toward the pump housing 120. The accommodating groove 131a,132a may be formed symmetrically with respect to the radial center of the one surface of the first magnetic body 131,132, facing the first magnetic body 131,132 so that the second magnetic body 140 can move forward and backward reliably, although the present disclosure is limited to this particular configuration. The damping member 171,172,173 is at least partially received in the accommodating groove 131a,132a. The accommodating groove 131a,132a conforms to the shape of the damping member 171,172,173 that is received. This prevents the damping member 171,172,173 from being separated from the accommodating groove 131a,132a.

As shown in FIGS. 1 to 10, The second magnetic body 140 is at least partially received in the hollow interior space of the sleeve 110. When an electric current is applied to the coil, the second magnetic body 140 is magnetized. When magnetized, the lower surface of the first magnetic body 131,132,133 and the upper surface of the second magnetic body 140 have opposite polarities. This generates attractive forces between the first magnetic body 131,132,133 and the second magnetic body 140 to each other. When the first magnetic body 131,132,133 and the second magnetic body 140 are attracted to each other with the first magnetic body 131,132,133 affixed, the second magnetic body 140 moves toward the first magnetic body 131,132,133. The second magnetic body 140 has an outer circumferential shape that conforms to the inner circumferential surface of the sleeve 110 to linearly move along and within the inner circumferential surface of the sleeve 110.

The elastic member 150 is disposed between the first magnetic body 130 and the second magnetic body 140. When no current is applied to the coil, the elastic member 150 pushes the second magnetic body 140 downward to close the orifice 185. Specifically, the spherical member 190 installed on the second magnetic body 140 at its end facing the orifice 185 of the seat 180 is in close contact with the orifice 185 to close the orifice 185.

When the electric power is applied to the coil, electromagnetic force FM acts on the second magnetic body 140 by the magnetic field inside the coil. When electromagnetic force FM is greater than the sum of hydraulic force FP and elastic force FS of the elastic member 150, the second magnetic body 140 begins to move to the first magnetic body 131,132,133. Here, hydraulic force FP is a force due to the pressure of the fluid between the first magnetic body 131, 132,133 and the second magnetic body 140.

The orifice 185 is configured to open and close as the second magnetic body 140 moves. The damping member 171,172,173,174 is inserted to form a gap between the first magnetic body 131,132,133 and the second magnetic body 140.

As shown in FIGS. 1 To 9, To form a gap between the first magnetic body 131,132 and the second magnetic body 140, the height of the damping member 171,172,173 may be greater than the depth of the accommodating groove in which the damping member 171,172,173 is received.

However, the present disclosure is not limited to this particular structure, and the height of the damping member 171,172,173 may be equal to the depth of the accommodating groove 131a,132a, and a protrusion may be formed on the damping member 171,172,173 at its one surface facing the second magnetic body 140, among various alternative embodiments covered by the present disclosure.

To manufacture the damping member 171,172,173, the first magnetic body 131,132 is inserted into a mold that is formed to shape the damping member 171,172,173, and a high-temperature molten material is poured into the mold. The molten material cools and solidifies to become the damping member 171,172,173. This manufacturing method is called insert molding.

Alternatively, the damping member 171,172,173 may be separately manufactured first without using the first magnetic body 131,132, and then the damping member 171,172, 173 may be coupled to the accommodating groove 131a, 132a of the first magnetic body 131,132.

The damping member 171,172,173 may be press-fitted to the accommodating groove 131a,132a so as not to be separated therefrom.

Figure 3:
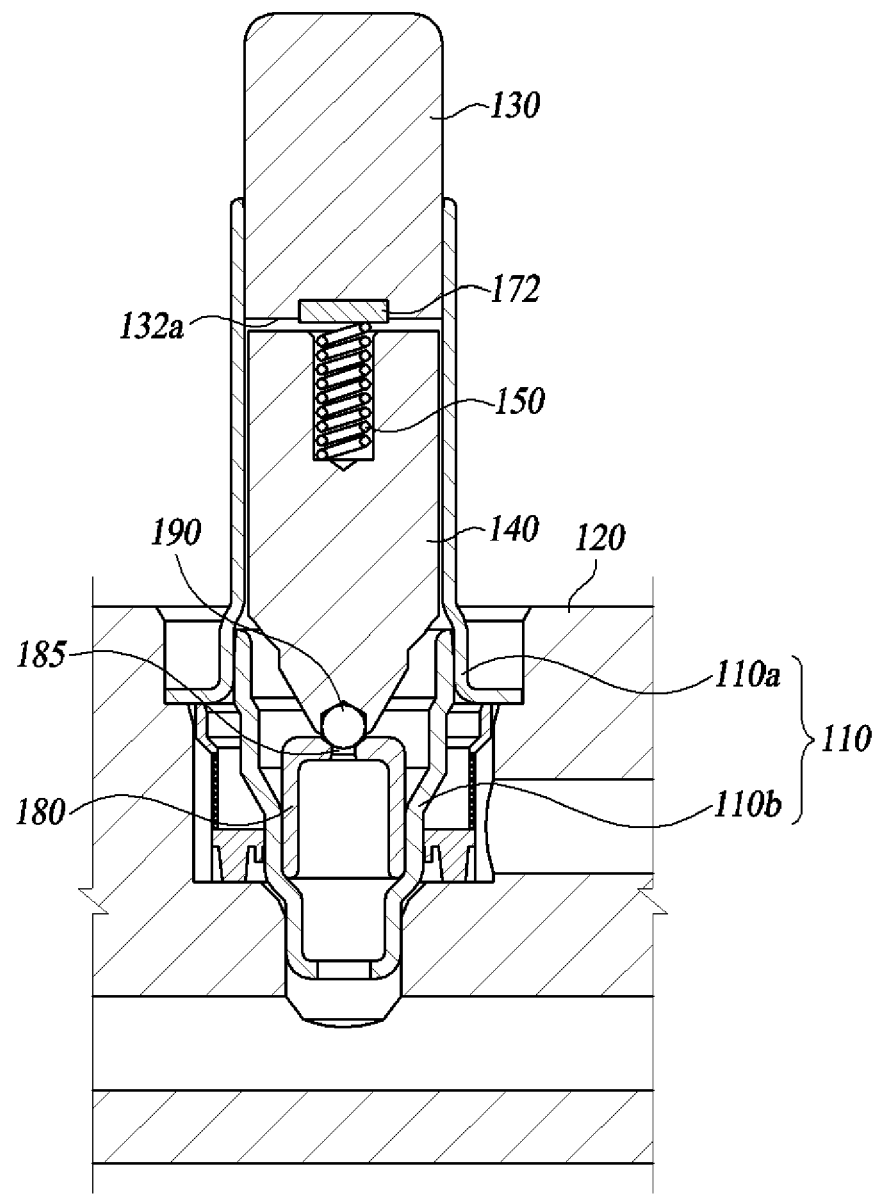
FIG. 3 is a cross-sectional view of the first magnetic body and the damping member according to the second embodiment of the present disclosure

As shown in FIG. 3, a first magnetic body 132 has one surface that faces the pump housing 120 and is formed with a disk-shaped accommodating groove 132a that is concentric with the central axis of the first magnetic body 132. The disk-shaped accommodating groove 132a receives a damping member 172 partially. With the disk-shaped accommodating groove 132a positioned concentrically with the first magnetic body 132, the second magnetic body 140 smoothly advances and retreats within the sleeve 110 even when the second magnetic body 140 is pressed against the damping member 172. In this case, the damping member 172 may be a cylindrical shape having a height greater than the depth of the accommodating groove 132a. This is to allow the damping member 172 to form a gap between the first magnetic body 132 and the second magnetic body 140.

Figure 4:
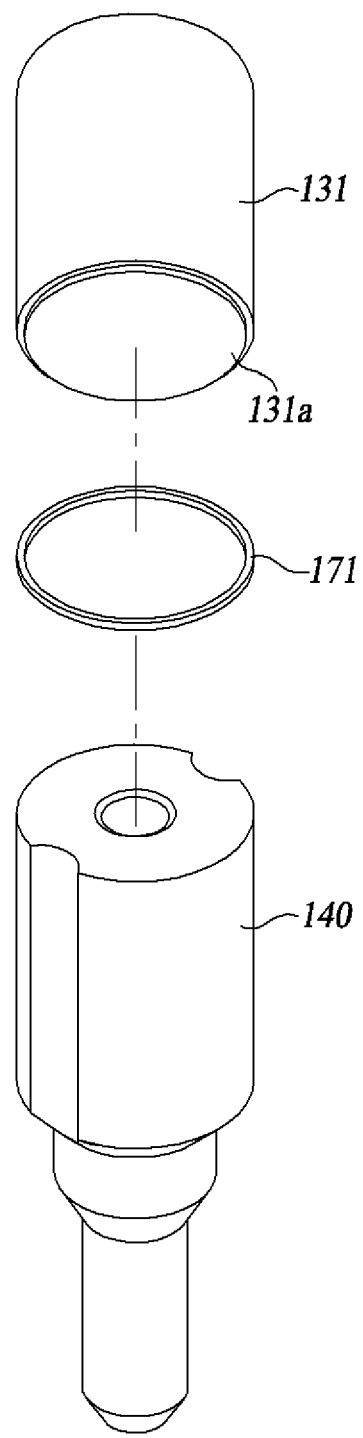
FIG. 4 is an exploded perspective view of the first magnetic body and the damping member according to the first embodiment of the present disclosure

As shown in FIG. 4, the first magnetic body 131 has the one surface facing the pump housing 120 and formed with the accommodating groove 131a that is annular and is concentric with the central axis of the first magnetic body 131. The damping member 171 may be partially received in the accommodating groove 131a. The damping member 171 may have an annular shape that is vertically larger than the depth of the accommodating groove 131a. This is to allow the damping member 171 to form a gap between the first magnetic body 130 and the second magnetic body 140.

The annular accommodating groove 131a may be formed on the outer circumference of the first magnetic body 131. With the annular accommodating groove 131a formed on the outer circumference of the first magnetic body 131, the damping member 171 can be easier to manufacture. For example, where the accommodating groove 131a is formed on the outer circumference of the first magnetic body 131, the damping member 171 can be manufactured by using a mold of a simple shape when the insert molding method is employed.

Figure 5:
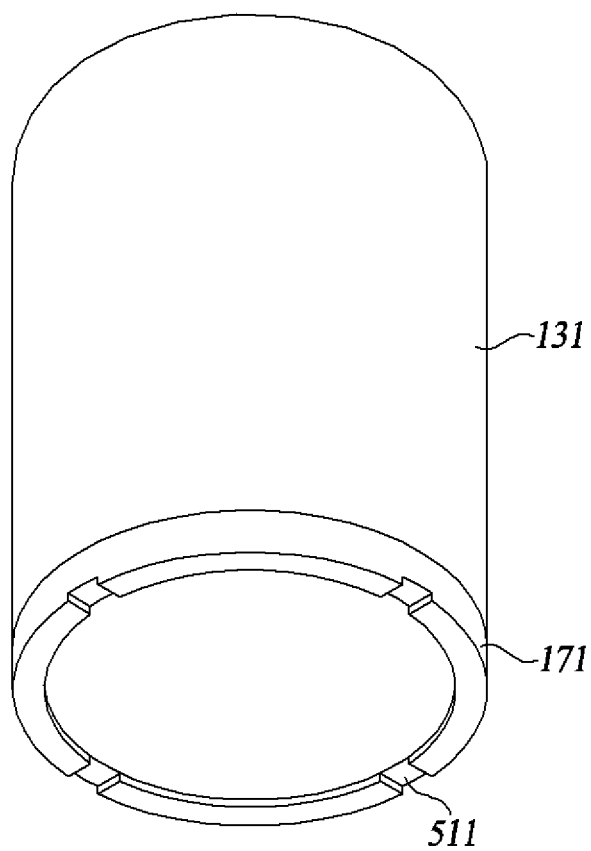
FIG. 5 is a perspective view of the flow path according to the first embodiment of the present disclosure.
Figure 6:
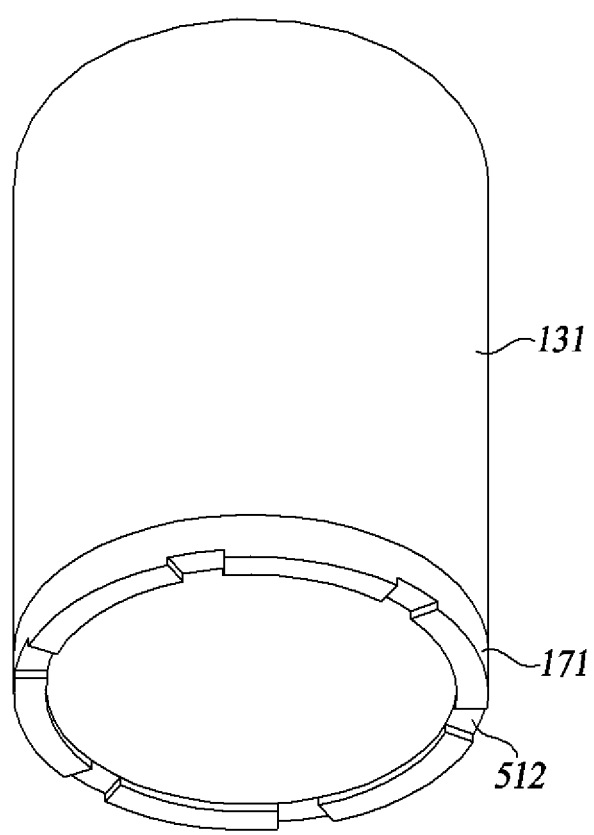
FIG. 6 is a perspective view of the flow path according to the second embodiment of the present disclosure.
Figure 7:
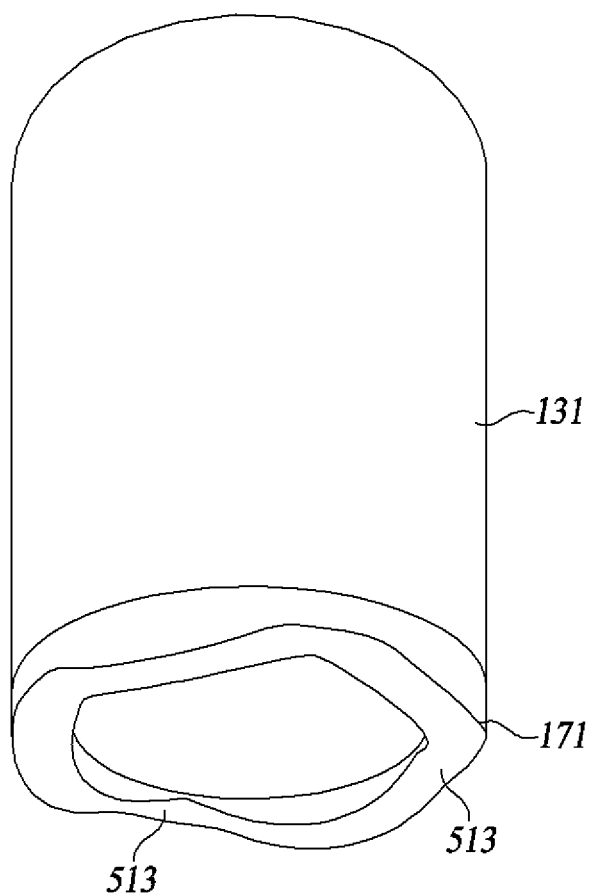
FIG. 7 is a perspective view of the flow path according to the third embodiment of the present disclosure.

As shown in FIGS. 5 to 7, the damping member 171 is formed with at least one flow path 511,512,513 communicating from externally of the damping member 171 to internally thereof. Multiples of the flow path 511,512,513 may be formed. The multiple flow paths 511,512,513 may be equiangularly disposed about the center of the damping member 171. Upon terminating the supply of electric current to the coil for the second magnetic body 140 to start moving downward, a negative pressure may generate in the space surrounded by the first magnetic body 131, the second magnetic body 140, and the damping member 171. The negative pressure generated may hinder the movement of the second magnetic body 140. By forming the flow paths 511,512,513 communicating from externally of the damping member 171 to internally thereof, the second magnetic body 140 may move smoothly uninterrupted by the negative pressure generated.

As shown in FIG. 6, the damping member 171 is formed with at least one flow path 512 having an inner cross-sectional area and an outer cross-sectional area that is larger than the inner cross-sectional area. For example, the flow path 512 is radially formed from the radial center of the damping member 171. However, the present disclosure is not limited to this particular shape, and the flow path 512 may be formed in a horn shape among other various possible shapes depending on embodiments as long as the radially outer cross-sectional area of the flow path 512 is greater than the radially inner cross-sectional area thereof. Here, the outer cross-sectional area means a cross-sectional area on the outer side when viewed in a radial direction, and the inner cross-sectional area means a cross-sectional area on the inner side when viewed in the radial direction.

As shown in FIG. 7, The profile of the end surface of the damping member 171 forming the flow path 513 according to the third embodiment is uneven or curved. The damping member 171 in at least one embodiment has a first contact surface that is in contact with the first magnetic body 131 and a second contact surface that may come in contact with the second magnetic body 140. In FIG. 7, the second contact surface is uneven or curved. The second contact surface with uneven or curved surfaces provides height differences to its cross-sectional profile for allowing the working fluid to pass internally and externally of the damping member 171. This can prevent the movement of the second magnetic body 140 from being interrupted.

The damping member 171 faces the second magnetic body 140 by the cross-sectional profile that is curved repeatedly to pass through a first height that is a maximum point and a second height that is a minimum point. The second contact surface has a wavy shape. The second contact surface with the wavy shape can reduce the contact area between the damping member 171 and the second magnetic body 140. With the contact area reduced between the damping member 171 and the second magnetic body 140, the magnitude of the impact sound can be reduced as it is generated when the damping member 171 and the second magnetic body 140 collide.

Figure 8:
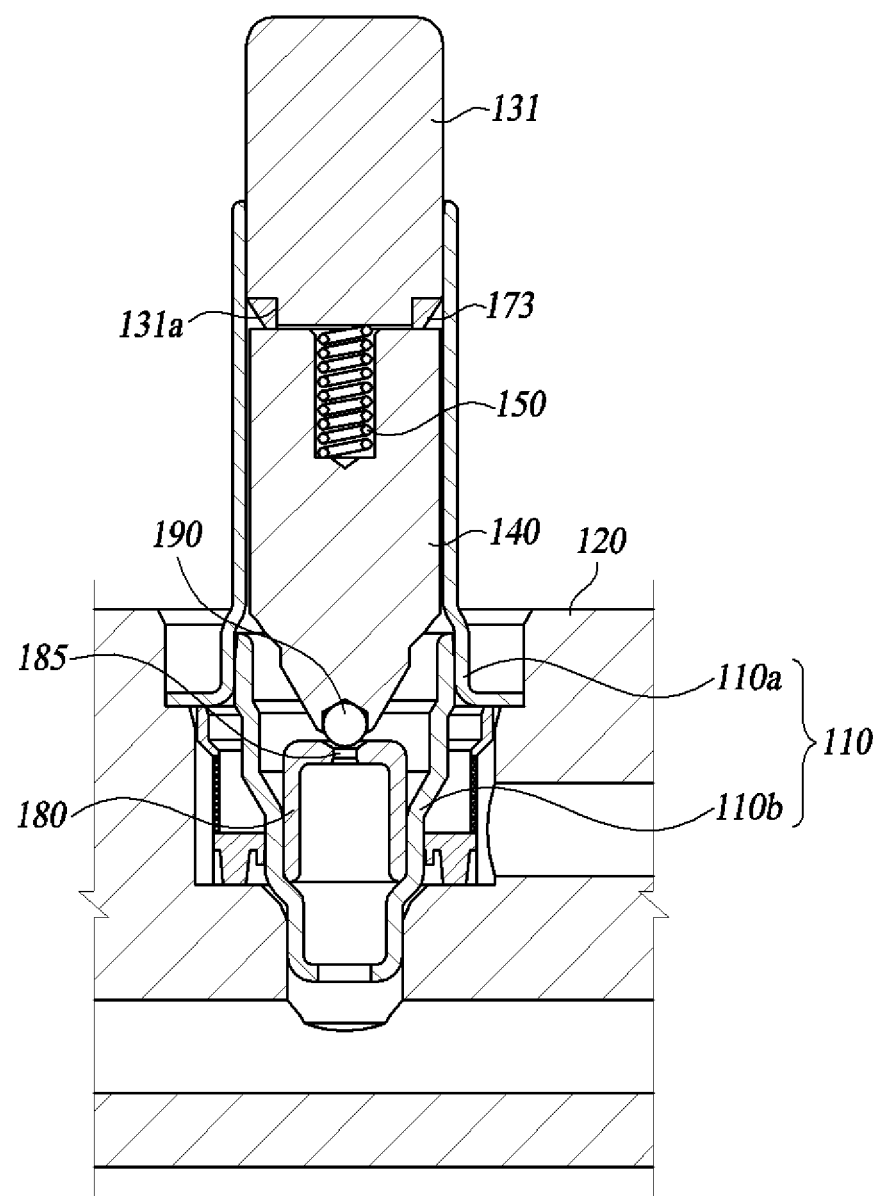
FIG. 8 is a cross-sectional view of the damping member according to the third embodiment of the present disclosure.
Figure 9:
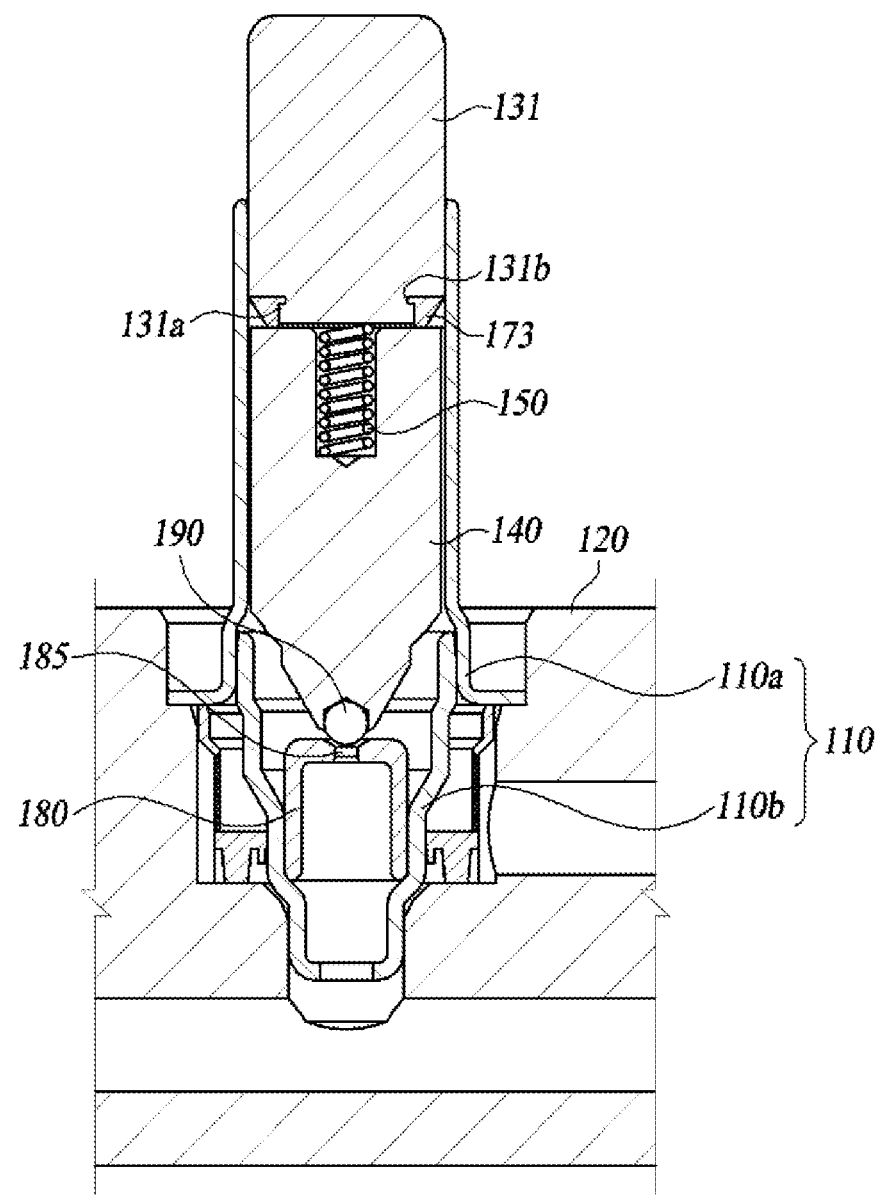
FIG. 9 is a cross-sectional view of a mount portion and a protrusion.

As shown in FIGS. 8 and 9, the solenoid valve according to yet another embodiment provides a damping member 173 has a first contact surface that is in contact with the damping member 173 and a second contact surface that may come in contact with the second magnetic body 140, wherein the first contact surface is larger than the second contact surface. With the colliding area reduced between the damping member 173 and the second magnetic body 140, the magnitude of the impact sound is reduced as it is generated when the damping member 173 and the second magnetic body 140 collide. For example, at least a partial area of the inner circumferential surface of the damping member 173 is in full contact with the outer circumferential surface of the accommodating groove 131a. The damping member 173 reaches out from the accommodating groove 131a. In other words, the height of the damping member 173 is greater than the depth of the accommodating groove 131a. The outer circumferential surface of the damping member 173 has a shape that becomes narrower toward the pump housing 120. However, the present disclosure is not limited to this particular shape and may encompass other variations such as forming one or more protrusions on the second contact surface.

As shown in FIG. 9, a first magnetic body 131 is formed with the mount portion 131b on which a damping member 173 is seated. The mount portion 131b may be incorporated in the accommodating groove 131a. the mount portion 131b may be a groove formed in the radial direction of the first magnetic body 131. However, the mount portion 131b of the present disclosure is not limited to the embodiment shown in FIG. 9. For example, the mounting portion 131b may be provided by forming the accommodating groove 131a in an inverted triangular shape. The damping member 173 conforms to the shape of the mount portion 131b to be seated thereon.

Figure 10:
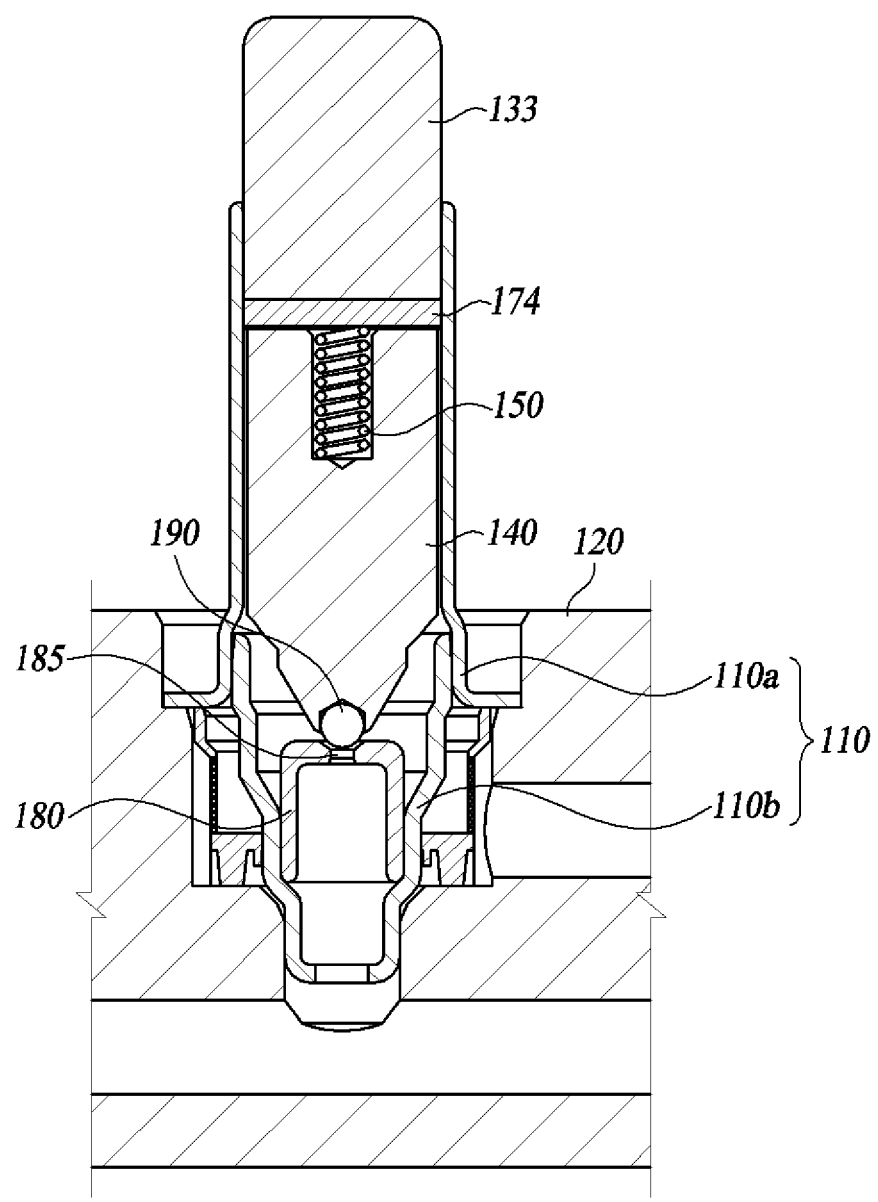
FIG. 10 is a cross-sectional view of the first magnetic member according to the third embodiment and the damping member according to the fourth embodiment of the present disclosure.
Figure 11:
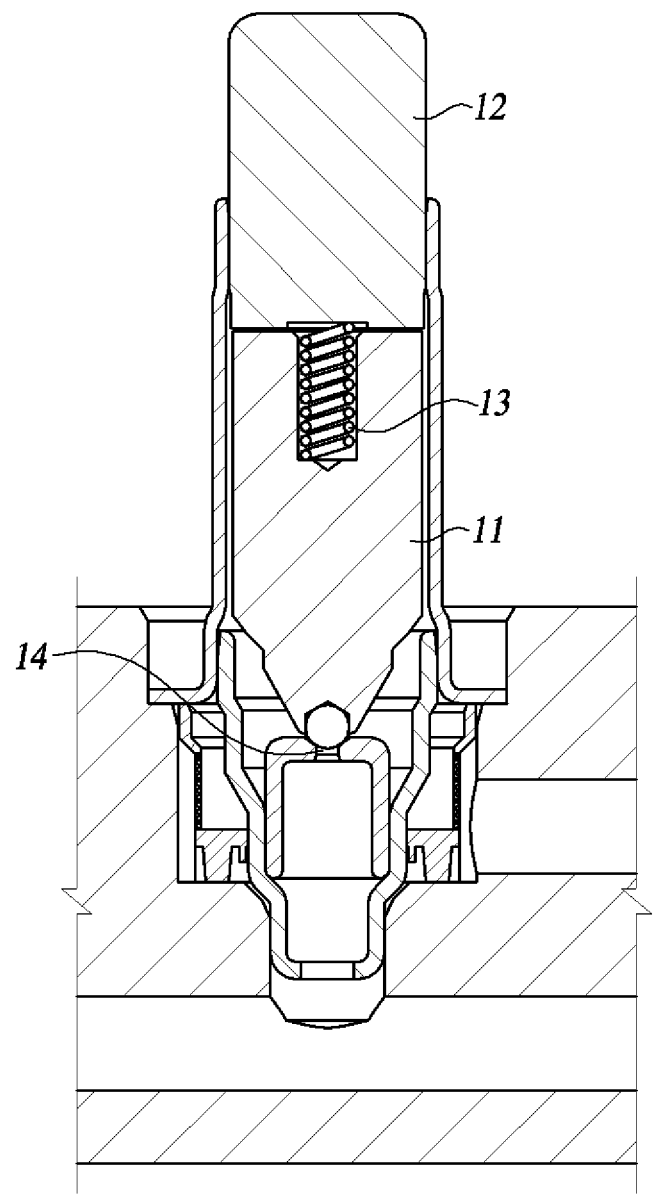
FIG. 11 is a cross-sectional view of a conventional solenoid valve for a brake of a vehicle.

As shown in FIG. 10, no accommodating groove is formed on the first magnetic body 133 at its surface facing the pump housing side, and a damping member 174 is disposed between a first magnetic body 133 and the second magnetic body 140. With the damping member disposed between the first magnetic body 133 and the second magnetic body 140, a gap is formed between the first magnetic body 133 and the second magnetic body 140.

With no accommodating groove formed in the first magnetic body 133, the damping member 174 desirably holds its initial position even when it deforms by coming into contact with both or either one of the first magnetic body 133 and the second magnetic body 140. The damping member 174 may be manufactured in a plate-type having an outer circumferential shape corresponding to an inner circumferential shape of the sleeve 110.

As described above, the solenoid valve for a vehicle according to at least one embodiment of the present disclosure can reduce the interior noise of a vehicle by inserting a damping member in the accommodating groove of the stator between the stator and the plunger.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A solenoid valve for a vehicle brake, comprising:
a sleeve having a hollow interior space and being connected to a pump housing;
a coil surrounding the sleeve;
a first magnetic body positioned at least partially in the hollow interior space of the sleeve;
a second magnetic body positioned at least partially in the hollow interior space of the sleeve and adjoining the first magnetic body;
an elastic member positioned between the first magnetic body and the second magnetic body; and
a damping member positioned between the first magnetic body and the second magnetic body and configured to form a gap between the first magnetic body and the second magnetic body,
wherein a groove is formed along an outer circumference of the first magnetic body, the groove having an annular shape concentric with a central axis of the first magnetic body,
wherein the damping member has a shape corresponding to the annular shape of the groove and is partially positioned in the groove,
wherein the damping member has:
a first contact surface in contact with the first magnetic body; and
a second contact surface in contact with the second magnetic body and smaller than the first contact surface, and
wherein the recessed flow path is disposed adjacent to a protruded area on the surface of the damping member and the recessed flow path has a cross-sectional area that is smaller in size than a cross-sectional area of the protruded area.

2. The solenoid valve of claim 1, wherein the damping member has an uneven surface in contact with the second magnetic body.

3. The solenoid valve of claim 2, wherein the uneven surface of the damping member forms a curved line extending laterally between a highest vertical point and a lowest vertical point.

4. The solenoid valve of claim 1, wherein:
the damping member has an inner circumferential surface, an outer circumferential surface and a flow path, and
the flow path has:
an inner cross-sectional area at the inner circumferential surface of the damping member; and
an outer cross-sectional area at the outer circumferential surface of the damping member, the outer cross-sectional area being larger than the inner cross-sectional area.

5. The solenoid valve of claim 1, wherein the damping member has a flow path extending radially from a radial center of the damping member.

6. The solenoid valve of claim 1, wherein:
the damping member has an inner circumferential surface at least partially in contact with an outer circumferential surface of the groove, and
the damping member has a height greater than a depth of the groove.

7. The solenoid valve of claim 1, wherein the first magnetic body comprises a mount portion, and the damping member is seated at the mount portion.

* * * * *